March 25, 1952     W. J. MILLER     2,590,443
CUTOFF PLATE FOR SPREADER BOXES
Filed Feb. 5, 1948
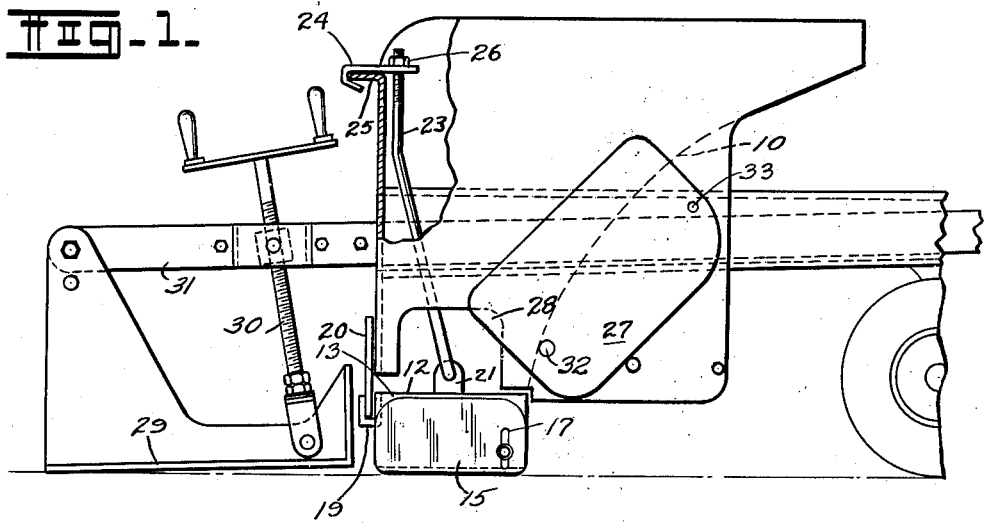
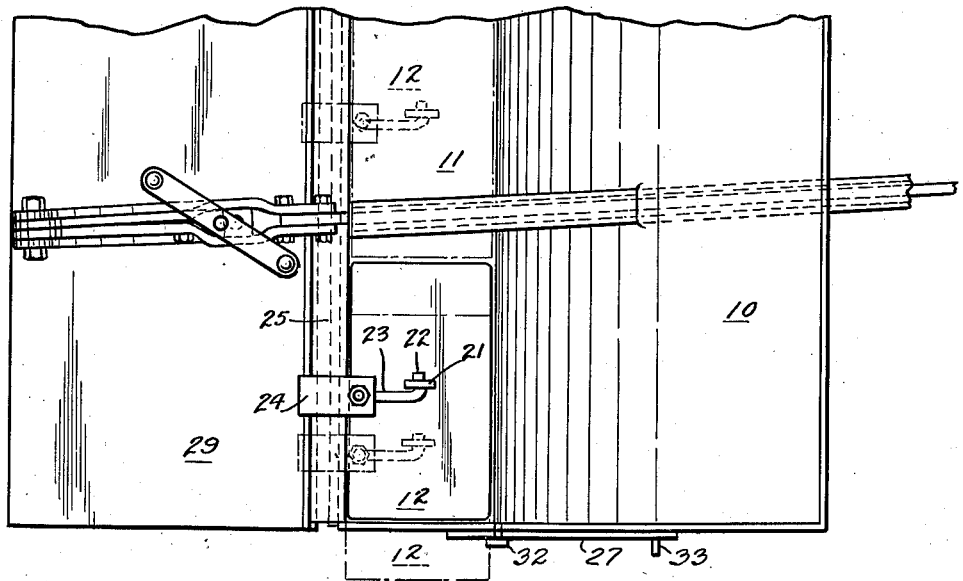
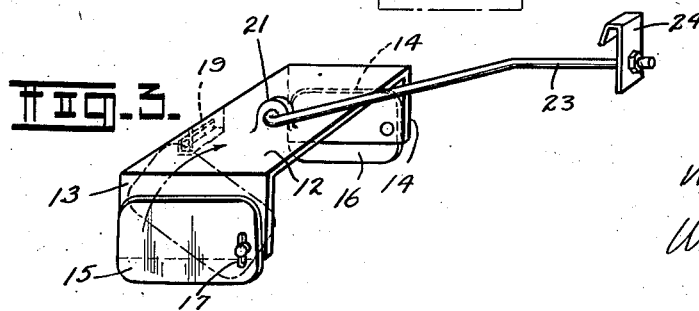
INVENTOR.
William J. Miller.
ATTORNEY.

Patented Mar. 25, 1952

2,590,443

UNITED STATES PATENT OFFICE 2,590,443

CUTOFF PLATE FOR SPREADER BOXES

William J. Miller, Youngstown, Ohio, assignor to Hy-Way Machinery, Incorporated, Youngstown, Ohio, a corporation of Ohio Application February 5, 1948, Serial No. 6,461

2 Claims. (Cl. 94—44)

This invention relates to spreader boxes in general and more particularly to a cutoff plate for use in connection therewith.

The principal object of the invention is the provision of a cutoff plate for a spreader box.

A further object of the invention is the provision of means for controlling the effective width of the discharge openings of spreader boxes and the like.

A still further object of the invention is the provision of a simple and inexpensive cutoff plate for use with a spreader box to control the flow of material therefrom.

A still further object of the invention is the provision of a cutoff plate for a spreader box so formed as to be easily and quickly installed thereon.

The cutoff plate for spreader boxes shown and described herein comprises an accessory for use in connection with spreader boxes used in spreading and leveling of bituminous paving materials as used, for example, on driveways and the like which are obviously of varying widths. The present invention relates to a cutoff plate designed for use with such spreader boxes whereby the effective spreading width of the spreader box may be varied by application of a cutoff plate.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of a portion of a spreader box with parts broken away and parts in cross section and showing the cutoff plate in position therein.

Figure 2 is a top plan view of a portion of a spreader box showing the cutoff plate in position therein in solid lines and in alternate position therein in dotted lines.

Figure 3 is a perspective view of the cutoff plate showing an edging device pivoted thereto.

By referring to the drawings and Figures 1 and 2 in particular it will be seen that a portion of a spreader box has been disclosed and particularly the hopper 10 thereof. As is known in the art, the hopper 10 of a spreader box is adapted to receive materials to be spread and to discharge the same through a transversely extending orifice 11 located in the bottom of the hopper 10, as the front wall of the hopper 10 slopes toward the orifice 11. As commercially produced, spreader boxes 10 are of uniform width and the material spread thereby is therefore spread in a uniformly wide layer. At such times as the spreader box 10 is used for spreading materials in driveways and the like relatively narrower than the width of the spreader box, means must of necessity be employed for reducing the spreading area of the box. Such means comprises the subject of the present disclosure and consists of a cutoff plate as shown in Figure 3 of the drawings which is adapted to be positioned within the spreader box 10 so as to close off a portion of the transversely extending orifice 11 thereof. The edges of the cutoff plate are in such close relation to the walls of the spreader box at the transverse opening as to prevent passage of material, except through the remaining portion of the opening. The cutoff plate comprises an inverted rectangular plate 12 with downturned end portions 13 and 14, respectively, each of which is preferably but not necessarily provided with a pivoted edging device 15 and 16, respectively, as shown in Figure 1 in operative position.

The edging devices 15 and 16 are shown in operative position in Figure 3 and by referring thereto it will be observed that they are preferably slotted at one end as at 17 so that they may rise and fall as they engage an uneven road bed over which the spreader box is passing. The spreader box itself is carried on ground engaging wheels. The rearmost edge of the rectangular plate 12 is provided with a U-shaped hook 19 which engages the lowermost edge of the adjustable back wall 20 of the spreader box 10. An upstanding boss 21 is provided on the rectangular cutoff plate 12 and has an opening formed transversely therethrough in which is engaged a horizontally formed end 22 of a vertically positioned support rod 23. The upper end of the vertically positioned support rod 23 is threaded and is provided with a clamp 24 adapted to be positioned over the upper outturned edge 25 of the back wall of the spreader box 10. A nut 26 is positioned on the threaded end of the vertically positioned support rod 23 to maintain the rectangular spreader plate in position, as shown in the transverse orifice 11 of the spreader box 10, where it will block the flow of material positioned in the blocks and hence effectively reduce the area of the outlet orifice of the box.

A majority of the spreader boxes 10 are provided with bleeder plates 27, each pivotally mounted by means of a pin 32 at one end and having a handle pin 33 at the other end, the bleeder plates normally closing bleeder openings 28 and at the same time acting as edging devices when the spreader boxes are used without cutoff plates as disclosed herein. In operating a spreader box 10 with the cutoff plate 12 in operative position therein, as shown in Figures 1 and 2 of the drawings, suitable blocking means such as a crumpled gunny sack (not shown) is usually positioned on the upper surface of the cutoff plate 12 so that material being spread will not flow out through the bleeder opening 28, alternately the bleeder plates 27 may be positioned to close the bleeder openings 28 above the cutoff plate 12.

In Figure 2 of the drawings alternate or multiple positionings of the cutoff plate 12 are shown, one being shown in solid lines in cutoff position adjacent the side of the spreader box 10 and another being shown in dotted lines disposed adjacent thereto. It will be obvious to those skilled in the art that the cutoff plate 12 may be moved sidewardly (as also shown in dotted lines in Figure 2) so that a portion thereof extends outwardly beyond the side of the spreader box 10. This adjustment makes possible the adaptation of the spreader box to the particular width of the driveway or roadway strip being paved thereby so that no excess material is deposited adjacent the area being paved.

In operation, the spreader box shown in Figure 1 of the drawings is moved from left to right, the material in the box 10 emerging through the transverse orifice 11 in the width determined by the positioning of the cutoff plate 12 and in a depth determined by the position of the spreader box 10. The material emerging is partially compacted and leveled by a screed 29 forming a part of the spreader box structure. The spreader box includes screed adjustment means 30 and a draw bar frame 31.

It will thus be seen that a cutoff plate for a spreader box has been disclosed which is advantageously employed in combination with the spreader box for effectively controlling the width of the material spread therefrom. It will also be obvious that the cutoff plate may be inexpensively formed and readily placed in position in a spreader box and equally readily removed therefrom when its use is not required.

Having thus described my invention, what I claim is:

1. In a spreader box having front, rear and side walls defining a transverse opening at the bottom of the box for discharge of material therethrough, means for adjustably limiting the transverse dimension of the opening, said means including a cutoff plate disposed in the opening adjacent one side wall and closing off a side portion of the transverse opening, and means supporting said cutoff plate in preselected positions of transverse adjustment relative to the spreader box, said spreader box being provided with a vertically adjustable back wall at the lower edge of the rear wall, said supporting means including a clamp slidably engaged on the upper edge of the rear wall and connected to the cutoff plate, and an inverted U-shaped hook secured to said plate and slidably engageable on the bottom edge of said adjustable back wall, said clamp and hook being cooperative to adjustably secure the cutoff plate in preselected positions of transverse adjustment.

2. In a spreader box having front, rear and side walls defining a transverse opening at the bottom of the box for discharge of material therethrough, means for adjustably limiting the transverse dimension of the opening, said means including a cutoff plate disposed in the opening adjacent one side wall and closing off a side portion of the transverse opening, and means supporting said cutoff plates in preselected positions of transverse adjustment relative to the spreader box, said cutoff plate having a downturned end portion providing an end wall for the transverse opening of the spreader box, said downturned end portion having an edging device pivotally mounted thereon.

WILLIAM J. MILLER.

REFERENCES CITED

The following references are of record in the file of this patent:

UNITED STATES PATENTS

| Number | Name | Date |
|---|---|---|
| 1,488,229 | Burns | Mar. 25, 1924 |
| 1,630,538 | Micallef | May 31, 1927 |
| 1,748,141 | Nickerson | Feb. 25, 1930 |
| 2,109,020 | Abernathy | Feb. 22, 1938 |
| 2,215,455 | Abernathy et al. | Sept. 24, 1940 |
| 2,225,431 | Lundbye | Dec. 17, 1940 |
| 2,267,022 | Gledhill | Dec. 23, 1941 |
| 2,403,820 | Miller | July 9, 1946 |